United States Patent [19]
Guccione

[11] 3,772,977
[45] Nov. 20, 1973

[54] CAMERA WITH MULTIPLE EXPOSURE FEATURE

[75] Inventor: Eugene S. Guccione, Metairie, La.

[73] Assignee: Plauche F. Villere, New Orleans, La.; a part interest

[22] Filed: Nov. 19, 1971

[21] Appl. No.: 200,359

[52] U.S. Cl. ................................................. 95/38
[51] Int. Cl. ......................................... G03b 19/02
[58] Field of Search .................................... 95/36, 38

[56] References Cited
UNITED STATES PATENTS

| | | | |
|---|---|---|---|
| 467,454 | 1/1892 | Walker | 95/38 |
| 475,919 | 5/1892 | Barril | 95/38 |
| 689,994 | 12/1901 | Spooner | 95/38 |
| 3,168,859 | 2/1965 | Mast | 95/38 |
| 3,598,035 | 8/1971 | Haller | 95/38 |

*Primary Examiner*—John M. Horan
*Attorney*—Harvey B. Jacobson et al.

[57] ABSTRACT

A camera including a body having a front side from which a lens assembly is supported and a rear side from which a film supporting and film plane defining back is supported. The camera body defines a light passage extending therethrough terminating rearwardly at the film plane defined by the back and axially aligned at its forward end with the center axis of the lens assembly carried by the front of the body. The back includes a plurality of openings extending therethrough in front to rear direction and spaced about a predetermined front to rear extending axis laterally offset relative to the center axis of the lens assembly an amount substantially equal to the radial distance the openings are spaced outwardly of the aforementioned predetermined axis. The back is supported from the body for angular displacement about the aforementioned predetermined axis and the latter is generally centered relative to the film format defined at the film plane whereby successive rotation of the back relative to the body to register openings on the back with the center axis of the lens assembly will enable a plurality of individual photographs to be taken by the camera on a single film format.

3 Claims, 7 Drawing Figures

PATENTED NOV 20 1973　　3,772,977

PATENTED NOV 20 1973 3,772,977

CAMERA WITH MULTIPLE EXPOSURE FEATURE

The camera of the instant invention has been specifically designed to provide a means whereby a plurality of different exposures may be made on a single frame of film carried by a camera. The camera is illustrated and described hereinafter as being provided with a Polaroid film pack supporting back, but it is to be noted that the principle of the invention may be utilized in conjunction with various different types of cameras such as portrait and other still cameras.

The multiple exposure camera includes relatively simple structural features that may be readily incorporated into the manufacture of various types of film supporting camera backs to be utilized on many different types of cameras. While multiple exposure cameras have been heretofore developed, these have accomplished the multiple exposure function in different manners and by structure which is not particularly well adapted for use in conjunction with a camera back designed to support Polaroid film packs.

The main object of this invention is to provide a camera having a multiple exposure feature whereby a plurality of exposures may be made on a single frame of film.

Another object of this invention is to provide a multiple exposure camera constructed in a manner whereby normal operation of the camera, whether it be provided with a range finder or other viewing means, may be carried out.

A still further object of this invention is to provide a camera having multiple exposure capability on a single frame of film and constructed in a manner whereby Polaroid pack film may be utilized.

A final object of this invention to be specifically enumerated herein is to provide a camera in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
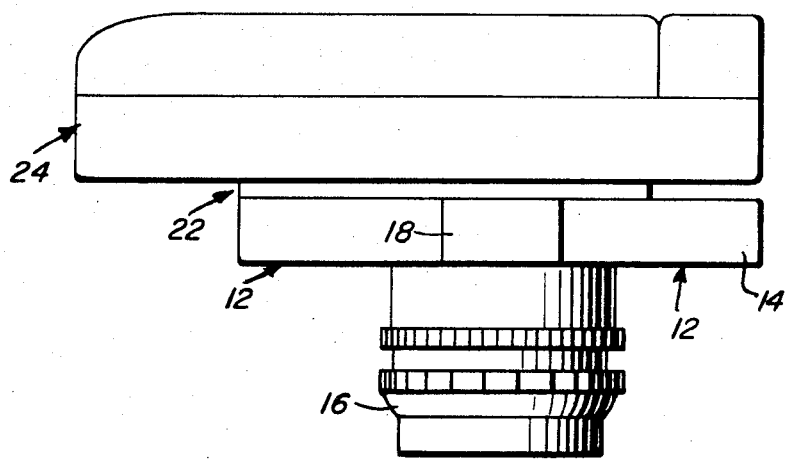
FIG. 1 is a top plan view of a camera constructed in accordance with the present invention.
Figure 2:
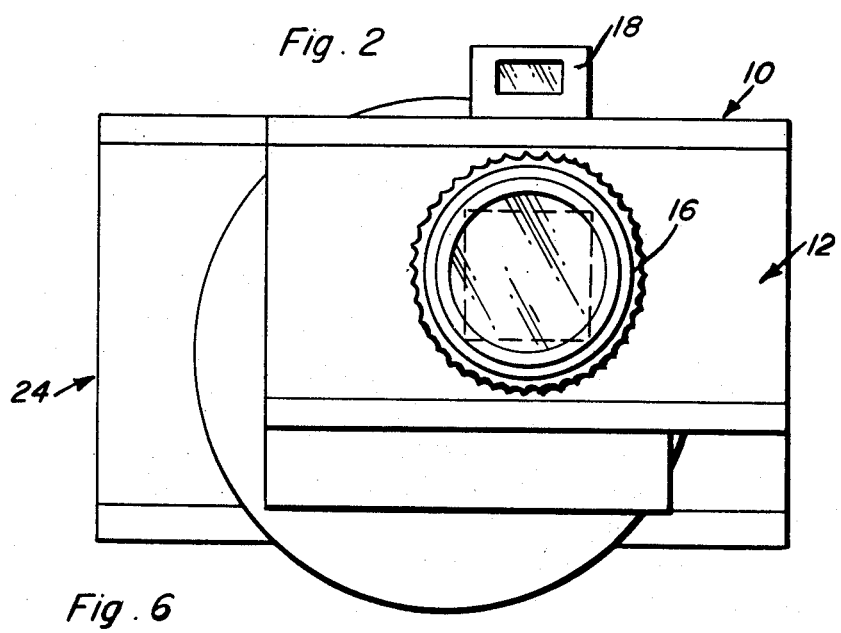
FIG. 2 is a front elevational view of the camera.
Figure 6:
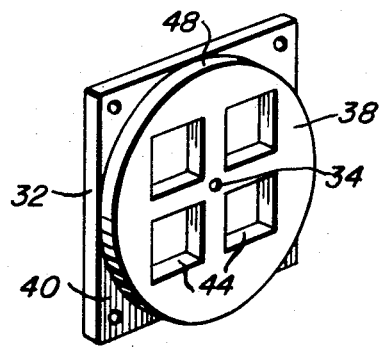
FIG. 6 is a perspective view of the rotatable portion of the rotary coupling defined between the back and the camera body.
Figure 7:
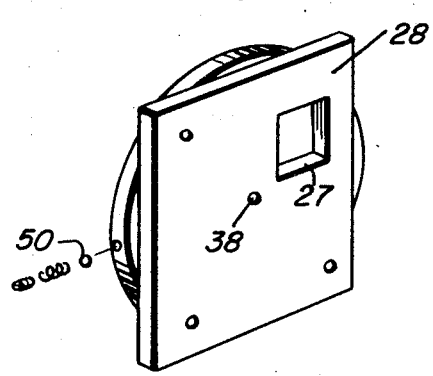
FIG. 7 is a perspective view of the stationary portion of the rotary coupling defined between the camera body and the rotatable back.
Figure 3:
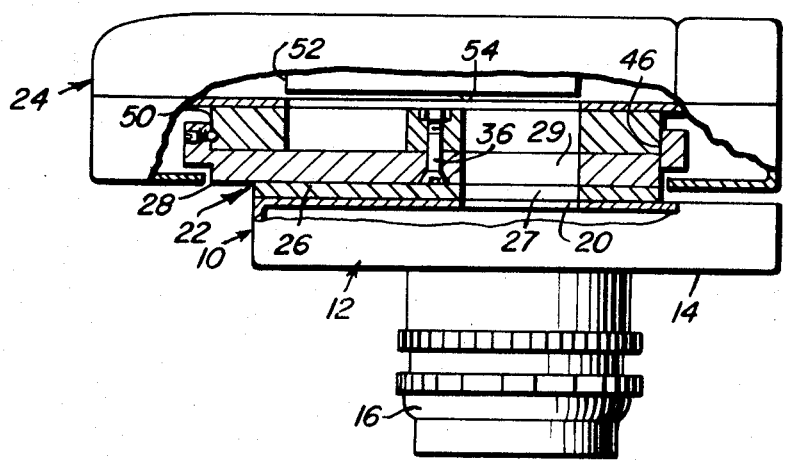
FIG. 3 is a top plan view similar to FIG. 1 but with portions of the camera body and the rotatable back of the camera being broken away and illustrated in horizontal section.
Figure 4:
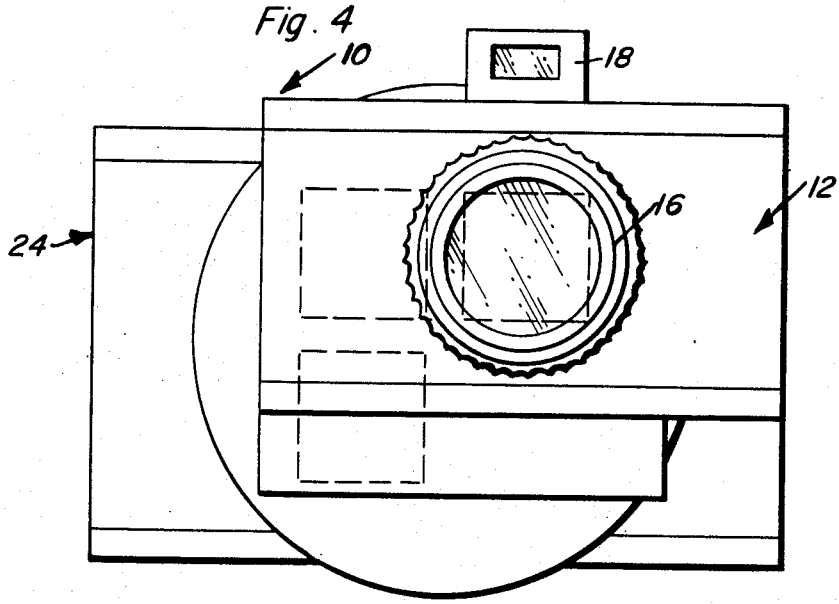
FIG. 4 is a front elevational view similar to FIG. 2 but with the back of the camera in a different rotated position.

Referring now more specifically to the drawings the numeral 10 generally designates a camera including a body 12 having a front side 14 from which a lens assembly 16 is supported. The body 12 further includes a view finder 18 and it is of course to be understood that the lens 16 and body 12 include structure (not shown) for varying the exposure time and the $f$-stop opening of lens assembly 16.

The camera body defines a light passage 20 registered with the center axis of the lens assembly 16 and a rotary coupling assembly referred to in general by the reference numeral 22 is provided and rotatably supports a Polaroid film pack supporting back assembly 24 from the rear side of the body 14.

The coupling assembly 22 includes a mounting plate 26 removably secured to the rear side of the body 12 in any convenient manner such as by fasteners (not shown) secured through the mounting plate 26 and in the body 12. The mounting plate 26 has a light passage 27 formed therethrough registered with the light passage 20 and the rotary coupling assembly 22 further includes a stationary base plate 28 which is secured to the mounting plate 26 in any convenient manner. In addition to the base plate 28 the rotary coupling assembly 22 further includes a rotary plate 32 having a central bore 34 formed therethrough. A pivot fastener 36 is secured through the bore 34 and a corresponding center bore 38 formed in the base plate 28 and thereby rotatably supports the rotatable plate 32 from the base plate 28.

The rotatable plate 32 includes an axially short cylindrical projection 38 which projects from the front face 40 thereof and outwardly through which the forward end of the bore 34 opens. The plate 32 further includes a plurality of square light openings 44 spaced equally radially outwardly from and circumferentially about the bore 34. The rear side of the base plate 24 defines a cylindrical recess 46 in which the cylindrical projection 38 is rotatably received and the outer periphery of the cylindrical projection 38 includes four equally spaced detent recesses 48 in which a spring-urged detent ball 50 carried by one peripheral portion of the base plate 28 is seatingly engageable.

The light passage 20 may be square in cross-sectional shape as may be the opening 28. Further, the base plate 28 has an opening 29 formed therein registered with the opening 27 formed in the mounting plate 26. Also, upon angular displacement of the rotatable plate 32 the openings 44 therein may be consecutively registered with the passage 20 and the openings 27 and 29.

The back 24 has a pack 52 of Polaroid film mounted therein and the front side of the pack 52 defines the film plane 54 of the camera 10.

Figure 5:
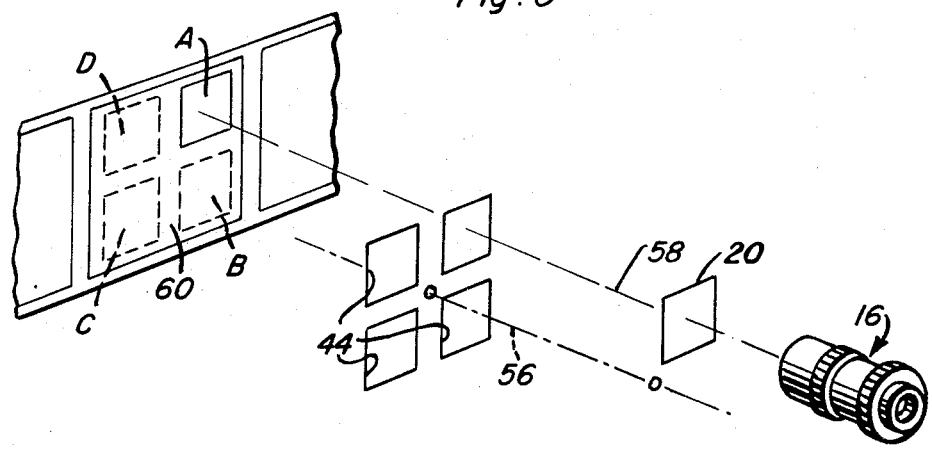
FIG. 5 is a schematic view of the camera lens, light passage defined through the camera body, the plurality of openings carried by the rotatable back and an associated frame of film with these components illustrated in exploded positions and in perspective.

From FIG. 5 of the drawings it may be appreciated that the axis 56 of rotation of the rotatable plate 32 in which the openings 44 are formed is spaced laterally of the center axis 58 of the lens assembly 16 and that the film frame 60 disposed behind the openings 44 may have the four corner portions thereof selectively registered with the center axis of the lens assembly 58 upon rotation of the back 24 to the four predetermined positions thereof defined by the detent recesses 48 and the spring-urged detent ball 50. Accordingly, the four areas A, B, C and D of the film frame 60 may be successively exposed whereby to obtain four exposures on the same film frame 60.

It is proposed that the camera 10 be constructed so as to be able to utilize film which provides a square format such as the film frame 60. By this method, the four individual exposure areas A, B, C and D may be closely fitted within the film frame 60 in order to obtain four exposures on the frame 60 with each being of the largest size possible.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a camera including a body having front and rear sides, a lens assembly having a center axis supported from said front side of said body, and a film supporting and film plane defining hollow back supported on the rear side of the body, said body defining a front to rear light passage extending therethrough having its forward end registered with said lens assembly, said body and back including coacting mounting means supporting the latter from the former for rotation about a front to rear pivot axis spaced laterally of said center axis, said mounting means including a first light blocking base panel stationarily supported from said back and disposed forward of said plane and transverse to said axes and including four front to rear extending openings formed therethrough spaced generally equally radially outwardly from and circumferentially about said pivot axis, said openings each extending rearwardly to a point spaced only slightly forwardly of said film plane, the radial spacing of said openings from said pivot axis generally equalling the lateral offset of said axes relative to each other, said mounting means further including a second base panel stationarily secured to the rear side of said body and having a single light opening formed therethrough centered relative to said center axis and means pivotally securing said panels together for relative rotation about said pivot axis, said back defining a film frame positioned generally centered relative to said pivot axis, one of said panels having a cylindrical recess formed in its side opposing the other panel with said recess concentric with said pivot axis, the other of said panels including a cylindrical projection snugly and rotatably nested and seated in said recess, said first panel openings being sequentially registered with said second panel opening upon relative rotation of said panels, said second panel opening being of an axial length equal to the thickness of said second panel minus the axial extent of said recess and each of said first panel openings being of an axial extent equal to the thickness of said first panel plus the axial extent of said projection, and said projection and recess being disposed entirely within the confines of said hollow back, said second panel opening and each of said first panel openings registered therewith defining a continuous closed passage for light to pass from said lens assembly to said film plane.

2. The combination of claim 1 wherein said coacting mounting means includes spring detent means operative to releasably secure said first base panel in each of the positions thereof in which one of said first panel openings is registered with said second panel opening.

3. The combination of claim 1 wherein said film frame is generally square and said first panel openings are generally square and equally closely spaced about said pivot axis.

* * * * *